United States Patent [19]
Blais

[11] Patent Number: 4,991,206
[45] Date of Patent: Feb. 5, 1991

[54] METHOD AND APPARATUS FOR JAMMING SELECTED TELEVISION PROGRAMS

[75] Inventor: Pierre Blais, Montreal, Canada

[73] Assignee: Electroline Equipment Inc., Quebec, Canada

[21] Appl. No.: 251,579

[22] Filed: Sep. 30, 1988

[51] Int. Cl.$^5$ .............................................. H04N 7/167
[52] U.S. Cl. .......................................... 380/7; 358/86; 455/1
[58] Field of Search .................... 380/7, 20, 25; 375/1; 358/86; 455/1, 4

[56] References Cited

U.S. PATENT DOCUMENTS

| | | | |
|---|---|---|---|
| 4,434,436 | 2/1984 | Kleykamp et al. | 380/7 |
| 4,521,809 | 6/1985 | Bingham et al. | 380/20 |
| 4,769,838 | 9/1988 | Hasegawa | 380/7 |
| 4,792,971 | 12/1988 | Uemura | 380/7 |

*Primary Examiner*—Linda J. Wallace
*Attorney, Agent, or Firm*—Norman B. Rainer

[57] ABSTRACT

In order to selectively jam M selected channels to selected subscribers in a CATV system, each of M different oscillating signals, each of which oscillating signals has a duration longer than the duration of the horizontal synchronization signal of the television channel it is to jam and a frequency higher than the carrier wave of the channel it is to jam, are in turn added to the television signal circuits of those subscribers who are not authorized to receive the particular channel being jammed by the jamming signal being added. The television set of the non-authorized subscriber picks up the higher frequency jamming signal as the valid horizontal synchronization signal and therefore ignores the valid horizontal synchronization signal, with the result that the channel in question is unviewable on the television set of the non-authorized subscriber.

13 Claims, 5 Drawing Sheets

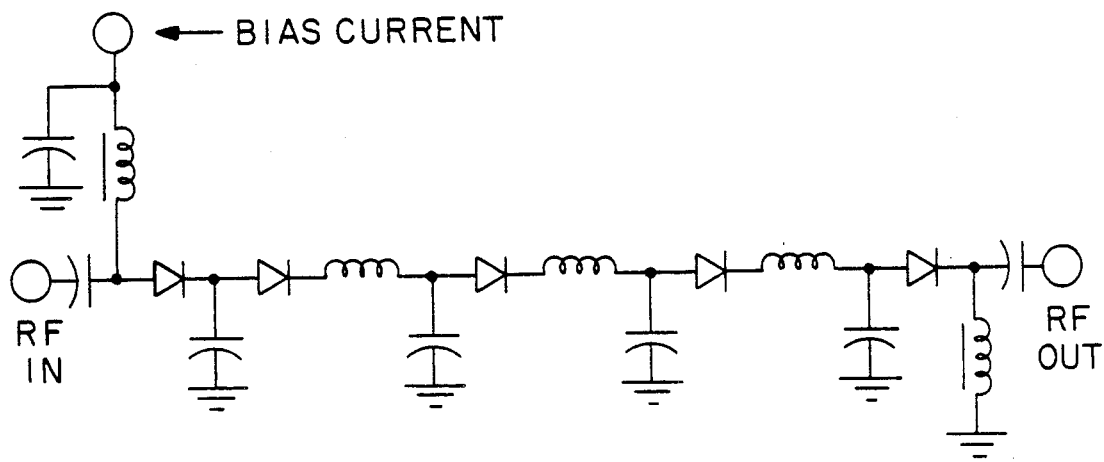
FIG. 4A
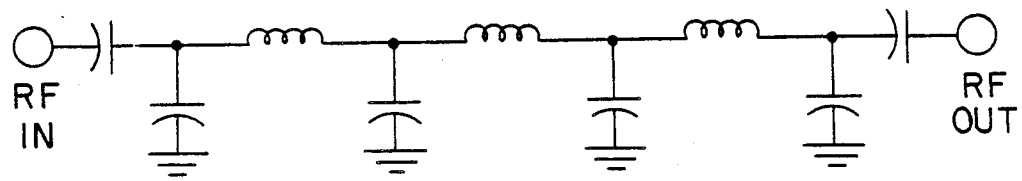
FIG. 4B
FIG. 4C
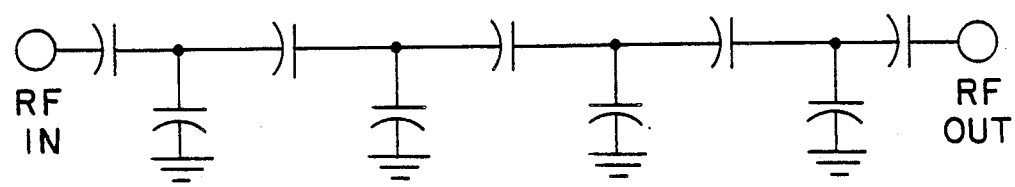

METHOD AND APPARATUS FOR JAMMING SELECTED TELEVISION PROGRAMS

BACKGROUND OF THE INVENTION

1. Field of the Invention

The invention relates to CATV systems, and more particularly to a method and apparatus for selectively jamming selected channels to selected subscribers in a CATV system.

2. Description of Related Art

CATV systems in which there are a number of channels provided to the subscribers are well known. Many CATV systems charge different amounts to their various subscribers, depending on how many of the supplied channels the particular subscriber wants to receive. For example only, a CATV system may offer channels 1 through 12 inclusive. The charge for viewing channels 1 through 9 inclusive might be $Y.00 per month. The charge for viewing channels 1 through 9 inclusive plus also channel 10 might be $Y.00+$10.00 per month. The charge for viewing channels 1 though 9 inclusive plus channels 11 and 12 might be $Y.00+$20.00 per month. Accordingly, since all of the subscribers are connected to the same controlled access medium a means has to be found to selectively deny channels 10 and/or 11 and/or 12 to those subscribers who have not paid the additional charge(s).

It is known in the art that certain channels can be scrambled prior to transmission from the supplier's head end and subsequently descrambled at the home ends of those subscribers who have paid for those scrambled channels. A device commonly referred to as a descrambler is installed in the paying subscribers homes, which restores the scrambled television signal. One problem with such a system is that the descrambler must be installed, thus access to the subscriber's home and manpower is needed. A second problem occurs if the subscriber no longer wants the channels, or defaults in paying for the channels, again, access to his home and manpower is needed to remove the descrambler. A third problem is that if a subscriber can buy or build an illegal descrambler he can obtain the additional channels without paying for them.

The other known means of selectively denying channels to selective subscribers is by selectively jamming the channels to be denied to the subscribers who have not paid for them. One known method of jamming channels is to send, along with the signal of each channel to be jammed, a signal having a repetition rate close to the vertical syncronization rate and of a greater amplitude than the vertical synchronization signal. The television will pick up the jamming signal as the synchronization signal and will therefore produce a vertically unstable picture. One problem with this means is that a vertically unstable picture is not as unwatchable as a horizontally unstable picture.

Another known means of jamming channels is to send, along with the signal of each channel to be jammed, a signal having a repetition rate close to the horizontal synchronization signal and of an amplitude greater than the horizontal synchronization signal. The television will pick up the jamming signal as the synchronization signal and will therefore produce a horizontally unstable picture.

A common problem with both of the known methods and ways in which they are known to be carried out is that the interfering signal must be produced, and it must be combined only with the television channel signal going to the subscribers who have not paid for that channel. If the interfering signal were combined with the television signal to all subscribers they would all have that channel jammed.

A known means of selectively combining each of the different jamming signals that are being put out for each of the different channels to be jammed with only those television signals going to the subscribers who are not authorized for that particular channel is used in U.S. Pat. No. 4,521,809. The known means used in U.S. Pat. No. 4,521,809 requires one separate line per subscriber and one switch per subscriber per channel that might be jammed. The separate subscriber lines are each coupled to a different switch for each channel that might be jammed, thereby creating a switch and subscriber line matrix in which each subscriber line has a unique switch for each channel that might be jammed, controlling that subscriber's access to said channel, and in which all switches controlling subscriber access to a particular channel are connected to each other. For example only, if the situation is that channel "A" is to be jammed to subscribers "1", "2", and "3", each of the channel "A" switches that couple the jamming signal means to the subscriber lines "1", "2" and "3" are closed. Accordingly, if there are 1000 subscribers and 5 channels to be jammed, 1000 separate subscriber lines are needed, and (5×1000)=5000 switches are required. Accordingly, a large number of switches is required. Additionally, it would not be an easy matter to add further subscriber lines and switches to the switch and subscriber line matrix.

SUMMARY OF THE INVENTION

The invention teaches a method for selectively controlling subscriber access to selected television channels which are being transmitted over a controlled access medium each of which television channels have a television signal which has a regularly spaced horizontal synchronization signal and is modulated onto a unique carrier wave which has a unique carrier wave frequency; said method is characterized in that said method is comprised of the steps of: "generating an oscillating signal having a duration longer than the duration of any of the regularly spaced horizontal synchronization signals of any of M television signals that are to be selectively jammed; and using M separate frequency generating circuits, each of which generates only one frequency, which frequency, if coupled with the generated oscillating signal, will cause the generated oscillating signal to have a frequency higher than the unique carrier wave frequency of the carrier wave of the television channel it is to jam, yet close enough to that carrier wave's frequency to be confusing with that carrier wave to a television signal circuit; and in turn, for separate periods of approximately 63.5 μs/M, coupling a different one of the frequencies from the M separate frequency generating circuits with the oscillating signal, thereby" generating M different oscillating signals {where M is an integer that is equal to the number of controllable services (i.e. channels) to be jammed}, each of which M different oscillating signals lasts for approximately 63.5 μs/M, and each of which M different oscillating signals has a duration longer than the duration of the horizontal synchronization signal of the television signal said oscillating signal will be used to jam, and each of which M different oscillating signals has a frequency higher than the carrier wave frequency of the channel it is to jam, yet close enough to the frequency of the carrier wave frequency of the channel it is to jam to be confusing with that carrier wave to a television set (thereby creating M different appropriate jamming signals each of which lasts for approximately 63.5 μs/M); in turn, for separate periods of approximately 63.5 μs/M each, combining a different one of the created M different appropriate jamming signals with the television signals going to all of the subscribers who are not authorized to receive the particular channel being jammed by that particular appropriate jamming signal, until each of the M different appropriate jamming signals has been combined one time with the television signals going to the appropriate subscribers; and then starting the cycle over again and continuing to start the cycle over again each time the cycle ends.

The invention, in addition to the stated method, also teaches an apparatus for selectively controlling subscriber access to selected television channels which are being transmitted over a controlled access medium each of which television channels have a television signal which has a regularly spaced horizontal synchronization signal and is modulated onto a unique carrier wave which has a unique carrier frequency; said apparatus taught by the invention is characterized in that it is comprised of: "generating means for generating an oscillating signal having a duration longer than the duration of any of the regularly spaced horizontal synchronization signals of any of M television signals; and M separate frequency generating circuits, each of which generates only one frequency, each of which frequency generating circuits, if coupled with the generating means will cause its generated oscillating signal to have a frequency higher than the unique carrier wave frequency of the carrier wave of the television channel it is to jam, yet close enough to that carrier wave's frequency to be confusing with that carrier wave to a television signal circuit; and coupling means which, in turn, for separate periods of approximately 63.5 μs/M each, couple a different one of the M separate frequency generating circuits with the generating means, thereby" generating M different oscillating signals {where M is an integer that is equal to the number of controllable services (i.e. channels) to be jammed}, for periods of time that may be as short as 63.5 μs/M, and each of which M different oscillating signals has a duration longer than the duration of the horizontal synchronization signal of the television signal said oscillating signal will be used to jam, and each of which M different oscillating signals has a frequency higher than the carrier wave frequency of the channel it is to jam, yet close enough to the frequency of the carrier wave frequency of the channel it is to jam to be confusing with that carrier wave to a television set (thereby creating M different appropriate jamming signals each of which may last for as little as approximately 63.5 μs/M); combining means capable of combining, for a period of time as short as 63.5 μs/M, any of the created M different appropriate jamming signals with the television signals going to all of the subscribers who are not authorized to receive the particular channel being jammed by that jamming signal; a service control means for instructing the combining means to combine one of the appropriate jamming signals with those subscribers' lines who are not authorized to receive the channel which said appropriate jamming signal will jam, and then after a period of approximately 63.5 μs/M instructing the combining means to stop combining the said appropriate jamming signal with the subscribers' lines who are not authorized to receive that particular channel, and then instructs the combining means to combine a different appropriate jamming signal with those subscribers' lines who are not authorized to receive the channel which said different appropriate jamming signal will jam, and then after a period of approximately 63.5 μs/M instructing the combining means to stop combining the said different appropriate jamming signal with the subscribers' lines who are not authorized to receive the channel which the said different appropriate jamming signal will jam, and then continues to instruct the combining means to combine and stop combining in turn, for turns of approximately 63.5 μs/M each, each of the remaining appropriate jamming signals with the subscribers' lines who are not authorized to receive the channel which the appropriate jamming signal in question jams until each appropriate jamming signal has been combined with the TV signals to the appropriate subscribers one and only one time for periods of time of approximately 63.5 μs/M each, and then starts the cycle over again, and continues to start the cycle over again each time the cycle ends.

Some of the advantages of the method and apparatus taught by the invention are that a very effective jamming of each of the channels to be jammed is achieved, and that only one jamming signal switch may be required per subscriber. Another advantage is that access to the subscriber's home is not needed to allow the subscriber to receive channels that are jammed, and access to the subscriber's home is not needed to deny the subscriber access to channels that are being jammed. Another advantage is that additional subscribers can easily be added to the system as each subscriber need only be connected to the system by one subscriber connection and one jamming signal switch, accordingly, to add on an additional subscriber all that may be needed is to add on to the end of a linear series of subscriber connections and jamming signal switches, one additional subscriber connection and one additional jamming signal switch.

BRIEF DESCRIPTION OF THE DRAWINGS

FIG. 4A is a schematic diagram of the master switch of the preferred embodiment of an apparatus according to the present invention;

FIG. 4B is a schematic diagram showing the equivalent R.F. circuit of the master switch illustrated in FIG. 4A, when that master switch is on;

FIG. 4C is a schematic diagram showing the equivalent R.F. circuit of the master switch illustrated in FIG. 4A, when that master switch is off.

DESCRIPTION OF THE PREFERRED EMBODIMENTS

The preferred embodiment of the method for selectively controlling subscriber access to selected television channels which are being transmitted over a controlled access medium each of which television channels have a television signal which has a regularly spaced horizontal synchronization signal and is modulated onto a unique carrier wave which has a unique carrier wave frequency is comprised of the steps of: generating a frequency modulated oscillating signal having a duration longer than the duration of the horizontal synchronization signal of any of the television signals said oscillating signal will be used to jam; "using M separate frequency generating circuits, each of which generates only one frequency, which frequency, if coupled with the frequency modulated oscillating signal, will cause the frequency modulated oscillating signal to have a frequency higher than the unique carrier wave frequency of the carrier wave of the television channel it is to jam, yet close enough to that carrier wave's frequency to be confusing with that carrier wave to a television signal circuit;" for M separate time periods of approximately 63.5 μs/M each {where M is an integer that is equal to the number of controllable services (i.e. channels) to be jammed} selectively coupling the oscillating signal with a different one of the M different frequencies, each of which frequencies will cause the oscillating signal to have a frequency higher than the carrier wave frequency of the channel it is to jam, yet close enough to the frequency of the carrier wave frequency of the channel it is to jam to be confusing with that carrier wave to a television set, and thereby creating M different appropriate jamming signals each of which lasts for approximately 63.5 μs/M; in turn, for separate periods of approximately 63.5 μs/M each, combining a different one of the created M different appropriate jamming signals with the television signals going to all of the subscribers who are not authorized to receive the particular channel being jammed by that particular appropriate jamming signal, until each of the M different appropriate jamming signals has been combined one and only one time with the appropriate television signals; and then starting the process over again and continuing to do so for as long as it was desired the system should selectively jam selected television channels.

Figure 1:
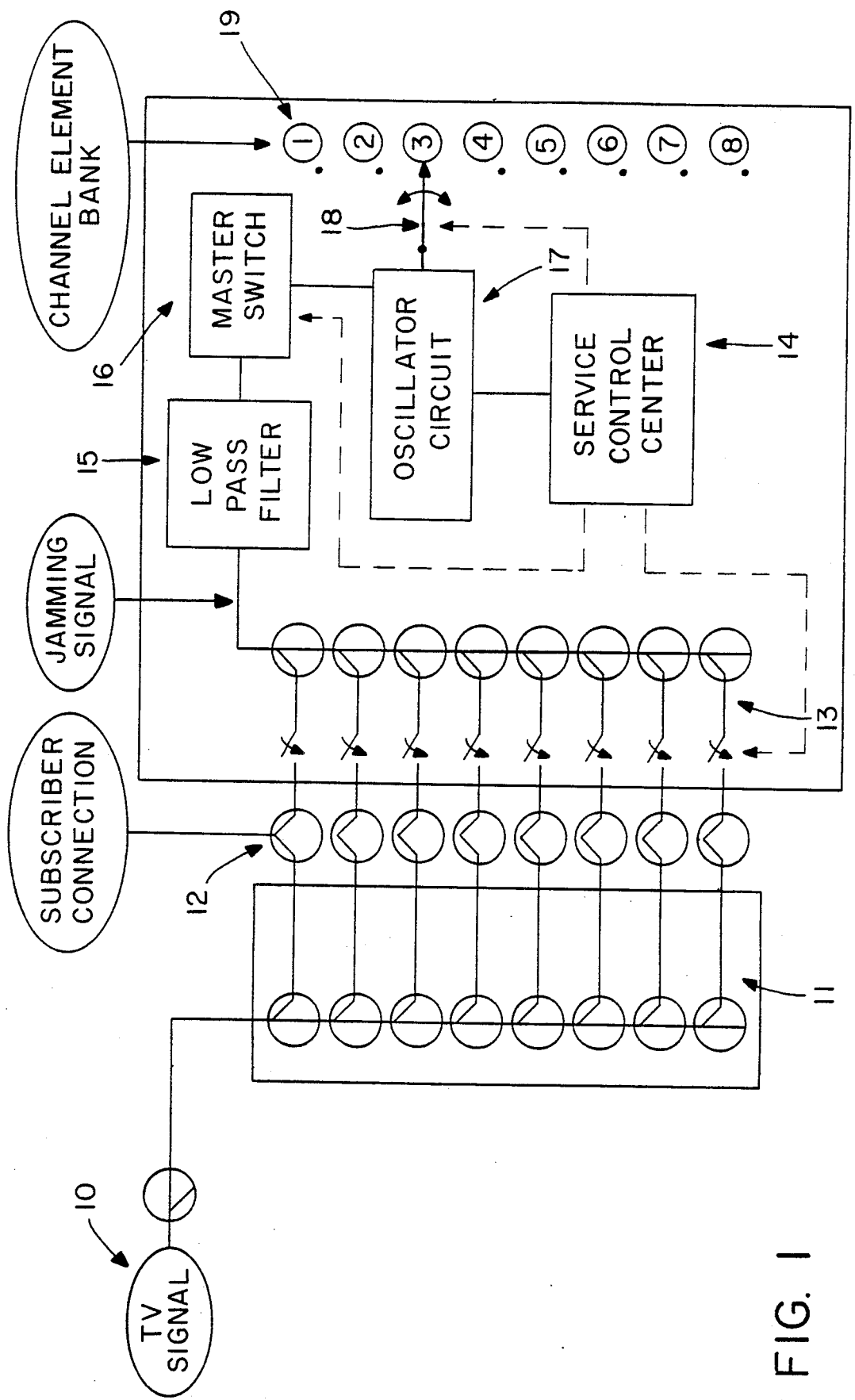
FIG. 1 is a schematic diagram showing a preferred embodiment of an apparatus of the invention.

The preferred embodiment of an apparatus according to the invention is illustrated in FIG. 1. The TV signal 10, which is received by the preferred embodiment carries all of the possible television channels the preferred embodiment is built to jam, and may also carry additional television channels. The preferred embodiment is comprised of: a set of television signal splitter circuits 11; a set of jamming signal switches 13; a set of subscriber signal combiner modules 12; an oscillator circuit 17; a coupling means 18; a channel element bank 19 made up of a series of different elements each of which when connected to the oscillator circuit will cause it to put out a jamming signal suitable for jamming a different pre-determined one of the TV channels in the TV signal 10; a master switch 16; a low pass filter 15; and a service control center 14.

In the preferred embodiment each of the television signal splitter circuits 11 receives the TV signal 10. The set of jamming signal switches 13 in the preferred embodiment is made up of N (where N is an integer) PIN Diode RF switches. Each of the jamming signal switches receives the jamming signal. The set of subscriber connections in the preferred embodiment is made up of N signal combiner modules. In the preferred embodiment the signal combiner modules are constructed using splitter circuits. Each subscriber connection connects the signal being put out from that subscriber's television signal splitter circuit and the signal being put out by that subscriber's jamming signal switch. Accordingly, when the subscriber's jamming signal switch is closed whichever channel is being jammed by the jamming signal will be jammed on that subscriber's television set.

In the preferred embodiment the oscillator circuit is constructed using an LC (inductor-capacitor) circuit and the necessary components to produce a frequency modulated oscillating frequency. The oscillator circuit 17 puts out a burst of radio-frequency signals with a duration equal to the {(time for a full horizontal line scan of one of the channels being received by the subscribers)÷M} {where M is an integer that is equal to the number of controllable services (i.e. channels) to be jammed}. Accordingly, since the time to scan a normal horizontal line is approximately 63.5 μs, it is not recommended that the system be set up to jam more than a maximum of 8 channels.

Each of the elements in the channel element bank 19 of the preferred embodiment is an LC (inductor-capacitor) circuit. The inductor and capacitor of each element in the channel element bank is selected so that when that element is coupled to the oscillator circuit the oscillator circuit will put out a frequency modulated jamming signal at a frequency higher than the carrier wave frequency of the TV signal that element was installed to jam.

The coupling means 18 of the preferred embodiment is a combination of switching PIN diodes. The coupling means 18 is able to couple any one of the elements in the channel element bank with the oscillator circuit for a period of time at least as short as 63.5 μs/M.

FIG. 4A is a schematic diagram of the master switch 16 of the preferred embodiment, which illustrates the construction of the master switch 16. The master switch 16 is a PIN diode RF interruptor that has a controlled rise and fall time to minimize the generation of spurious products during switching. The Master Switch is made up of the following components: a grounded capacitor connected with an inductor (which is called an "RF Choke"); six additional capacitors; five diodes; and four additional inductors. A first capacitor, which is the input, is followed by a shunt RF Choke, followed by a series first diode, followed by a shunt second capacitor, followed by a series second diode, followed by a series first inductor, followed by a shunt third capacitor, followed by a series third diode, followed by a series second inductor, followed by a shunt fourth capacitor, followed by a series fourth diode, followed by a series third inductor, followed by a shunt fifth capacitor, followed by a series fifth diode, followed by a shunt fourth inductor, followed by a series sixth capacitor, which is the output. When the master switch is on, direct current flows through the diodes and they become conductive; the master switch is then the equivalent of a low pass filter having a cut-off frequency higher than the highest frequency of interest, the schematic diagram of that equivalent circuit is illustrated in FIG. 4B. When the master switch is off the current stops flowing through the PIN diodes and then each diode becomes like a small capacitor; the master switch is then the equivalent of a capacitive ladder attenuator, which equivalent circuit is illustrated in FIG. 4C.

The low pass filter 15 of the preferred embodiment is made up of capacitors and inductors. The purpose of the filter is to eliminate the harmonics from the oscillator and master switch circuit.

The service control center 14 is an electronic control unit. The service control center of the preferred embodiment is made up of a microcontroller with a ROM program, RAM circuits, logic I.C.'s, operational amplifiers and the necessary assorted inputs, outputs and standard circuitry necessary for operation. The service control center, when it first starts operating initializes the system by opening the master switch and opening all switches in the set of jamming signal switches and causing the coupling means to disconnect the oscillator circuit from any of the elements in the channel element bank. The service control center then causes the coupling means 18 to couple the first element in the channel element bank with the oscillator circuit for approximately 63.5 µs/M (period 1). The service control center then, in period 1, causes the switches in the set of jamming signal switches, which connect to subscribers who are not authorized to receive the channel which will be jammed by the jamming signal created when the first element in the channel element bank is coupled with the oscillator circuit to be closed for approximately 63.5 µs/M. The service control center then, in period 1, causes the master switch to close for approximately 63.5 µs/. The service control center then at the end of period 1 causes the master switch to open. The service control center then causes the coupling means 18 to couple the second element in the channel element bank with the oscillator circuit for approximately 63.5 µs/M (period 2). The service control center then, in period 2, causes the switches, in the set of jamming signal switches, which connect to subscribers who are not authorized to receive the channel which will be jammed by the jamming signal created when the second element in the channel element bank is coupled with the oscillator circuit, to be closed for approximately 63.5 µs/M. The service control center then, in period 2, causes the master switch to close for approximately 63.5 µs/M. The service control center then at the end of period 2 causes the master switch to open. The service control center then in different periods of 63.5 µs/M each continues to perform the said series of operations, using the next element of the channel element bank in each period of 63.5 µs/M until each of the elements in the channel element bank has been coupled one and only one time with the oscillator circuit. The service control center then starts the said cycle over again, and continues to start the cycle over again each time the cycle ends.

Figure 2:
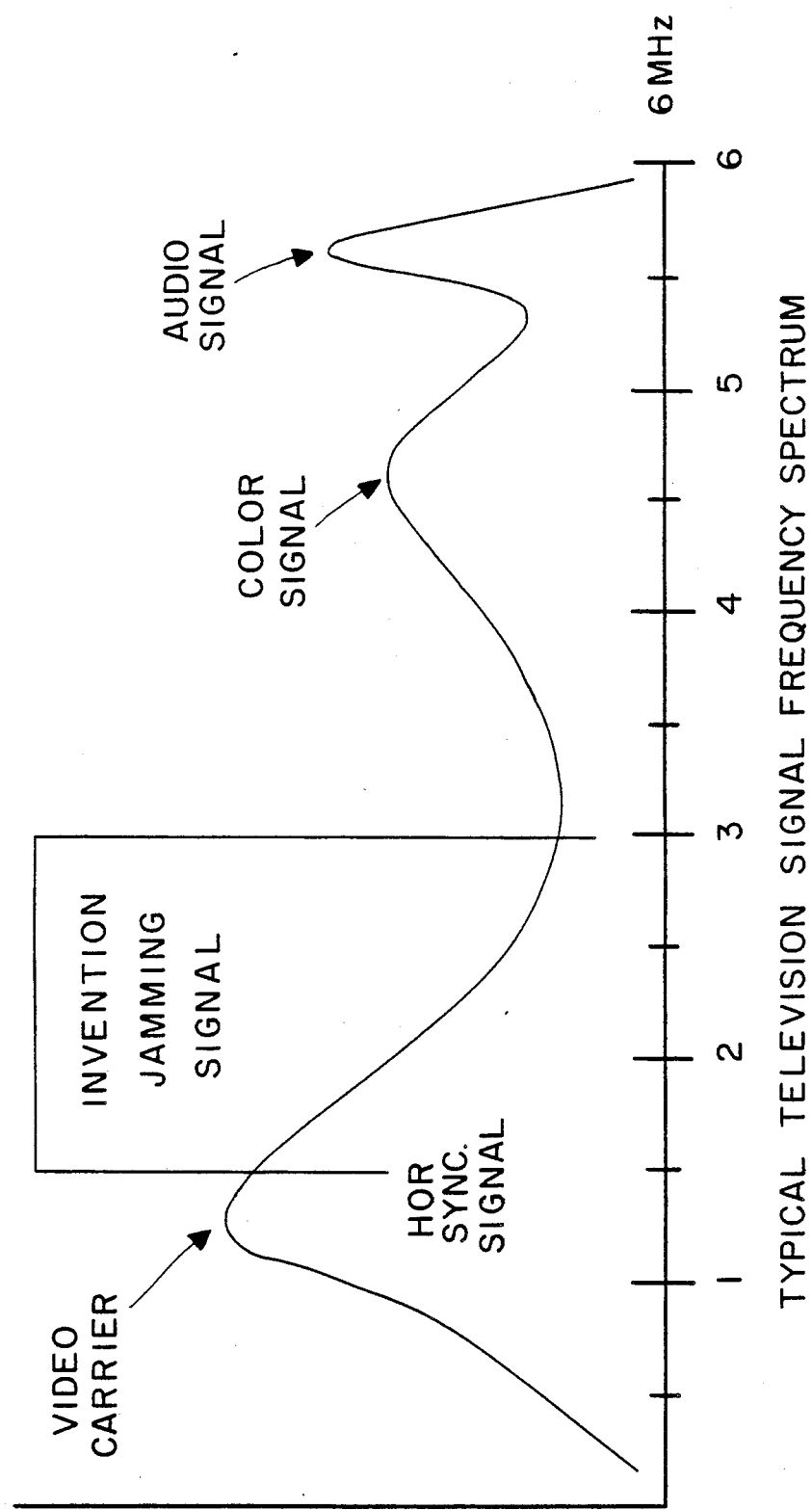
FIG. 2 is an illustration showing the frequency spectrum of a television signal and indicating where the jamming signal of the invention would fall within that frequency spectrum.
Figure 3:
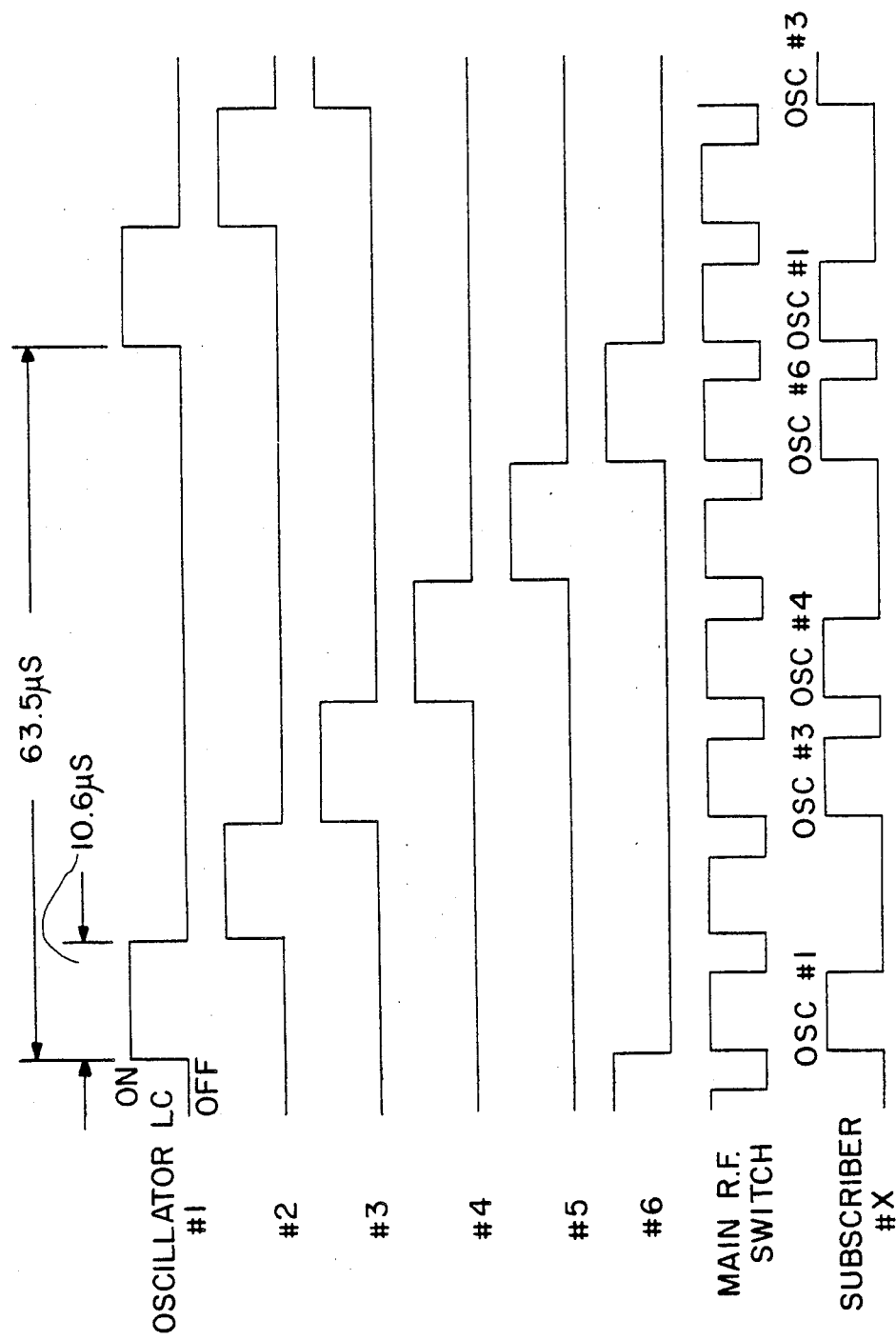
FIG. 3 is a timing diagram illustrating one possible timing scheme for the invention when it has been set up to selectively jam six channels to selected subscribers.

FIG. 2 illustrates a typical television signal frequency spectrum, and where the jamming signal of the invention would appear. The jamming signal of the invention has an amplitude greater than that of the horizontal synchronization signal and is frequency modulated so that the frequency of the jamming signal is not constant. The jamming signal is therefore moving in the television channel's allocated band to assure a jamming that is more reliable.

The television sets of the subscribers who have had a jamming signal added to their television signals, if tuned to the jammed channel, will therefore lock onto the jamming signal (since it is of a greater amplitude) instead of the proper horizontal synchronization signal. Accordingly, said subscribers' jammed channel will have a television picture that rolls and distorts, and will have impaired sound of the television program.

In the preferred embodiment a very effective jamming of each of the channels to be jammed is achieved, and only one jamming signal switch is required per subscriber. Additional advantages to the preferred embodiment are also apparent. Access to the subscriber's home is not needed to allow the subscriber to receive channels that are jammed, and access to the subscriber's home is not needed to deny the subscriber access to channels that are being jammed. Subscribers can easily be added to the system as each subscriber need only be connected to the system by one subscriber connection and one jamming signal switch, accordingly, to add on an additional subscriber all that is be needed is to add on to the end of the linear series of subscriber connections and jamming signal switches, one additional subscriber connection and one additional jamming signal switch.

Figure 1A:
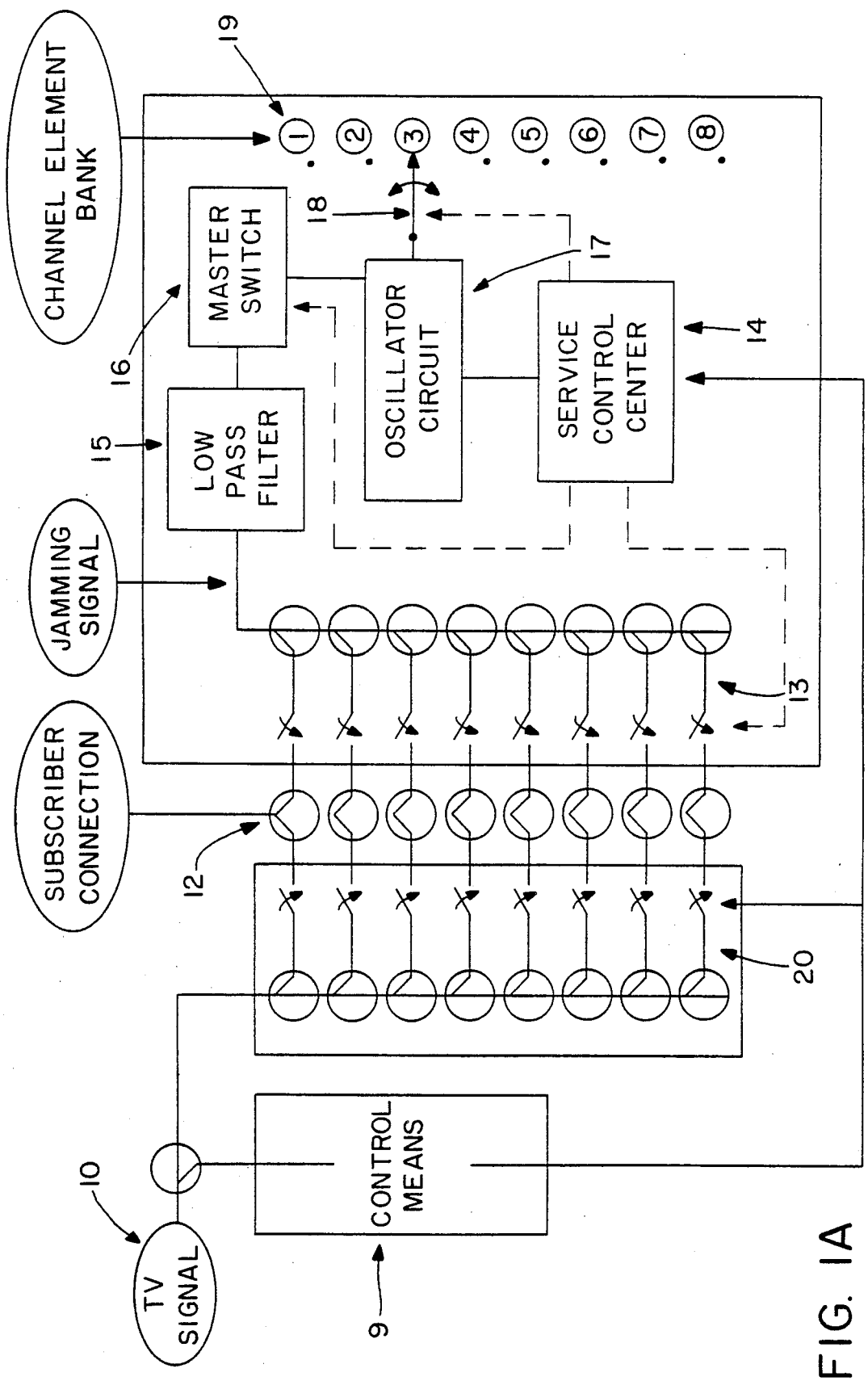
FIG. 1A is a schematic diagram showing a preferred embodiement of an apparatus of the invention working in conjunction with a control means and TV signal switches.

It is anticipated that generally the invention and especially the preferred embodiment of an apparatus of the invention will be used in conjunction with a control means and with TV signal switches instead of television signal splitter circuits. FIG. 1A illustrates the invention working in conjunction with a control means 9 and with TV signal switches 20. In operation the TV signal 10 also has sent along with it coded information that tells the control means 9 which TV signal switches 20 should be turned on, and which subscribers should have which of their channels jammed. The construction of a control means able to receive coded information telling it which TV signal switches to turn on, and which subscribers should have which of their channels jammed, and able to turn on the appropriate TV signal switches and able to inform the Service Control Center which subscribers should have which of their channels jammed, is well known by those skilled in the art. The TV signal switches would also be well known to those skilled in the art and could, for example only, be PIN Diodes RF switches or RF relay switches.

When the preferred embodiment of an apparatus of the invention is used in conjunction with a control means and with TV signal switches it is very simple for a CATV operator to deny certain channels to certain subscribers from the head end. The CATV operator merely enters the appropriate information into the system at the head end. The information is then transmitted along with the TV signal to the control means, which decodes that information and provides it to the service control center. The service control center then causes the appropriate subscribers' jamming signal switches to close at the appropriate times and the appropriate jamming signals are combined to those subscribers' received television signals, thus denying them the appropriate channels.

Variations to the preferred embodiment can easily be made. The signal combiner modules could be constructed using directional couplers instead of splitter circuits as is used in the preferred embodiement. The switches of the set of jamming signal switches, could for example only, be RF Ga As Fet switches instead of PIN Diodes RF switches as are used in the preferred embodiment. The master switch, for example only, instead of being constructed as described for the preferred embodiment, could be constructed using a Ga As Fet RF switch assembly.

Additional variations to the preferred embodiment are also possible, the following are only a few additional examples. The oscillator circuit, coupling means and channel element bank could be replaced by using M independent oscillator circuits, each putting out a different jamming signal. The LC elements of the preferred embodiment could be replaced with quartz crystals, or with a ceramic resonator, or a saw resonator.

Finally, many alternative ways to construct the service control center and some of its components will be clear to those skilled in the art.

Accordingly, many alternatives to the construction of the preferred embodiement, some of which are obvious to those skilled in the art but not specifically stated herein, will be apparent to those skilled in the art. This disclosure is therefore to be understood as illustrative of the invention and not as a limitation of the invention. All such modifications and alternatives which do not depart from the teachings of this invention are intended to be included within the claims.

The invention claimed is:

1. A method of selectively preventing the viewability by multiple unauthorized subscribers, and allowing the viewability by multiple authorized subscribers, of, where M is an integer, from 1 to M selected television channels, each of which M selected television channels is respectively referred to as channel 1, channel 2, . . . channel M, and each of which M selected television channels is referred to in general as channel Z, where Z represents a number from 1 to M, wherein channel Z has a television signal and a unique carrier wave which has a unique carrier wave frequency, and wherein said television signal has a regularly spaced horizontal synchronization signal and is modulated onto said unique carrier wave, accordingly there are M television signals and M unique carrier waves, and wherein said multiple authorized and multiple unauthorized subscribers are each using a television signal circuit to receive the M television signals of the M selected television channels, which television signals are being transmitted over a controlled access medium to each subscriber's television signal circuit, and accordingly are being transmitted to multiple television signal circuits, wherein said method is characterized in that it is comprised of the steps of:

(i) generating an oscillating signal having a duration longer than the duration of any of the regularly spaced horizontal synchronization signals of any of the M television signals;

(ii) using M separate frequency generating circuits, each of which generates only one frequency, to generate M frequencies, each of which frequencies is respectively referred to as frequency 1, frequency 2, . . . frequency M, and each of which frequencies is referred to in general as frequency Z, wherein each frequency generating circuit generates a frequency Z, which if coupled with the generated oscillating signal, will cause the generated oscillating signal to have a frequency higher than the unique carrier wave frequency of the carrier wave of channel Z, yet close enough to that carrier wave frequency to be confusing with that carrier wave to a television signal circuit;

(iii) in turn, for separate periods of approximately 63.5 $\mu$S/M each, where Z in turn is each of the numbers 1 to M, coupling the frequency generating circuit that generates frequency Z with the generated oscillating signal, thereby creating M different jamming signals, each of which is respectively referred to as jamming signal 1, jamming signal 2, . . . jamming signal M, and each of which is referred to in general as jamming signal Z; and (iv) starting a cycle and going through a cycle, which cycle consists of, in turn, for separate periods of approximately 63.5 $\mu$S/M each, where Z in turn is each of the numbers 1 to M, combining jamming signal Z with the television signal of channel Z that is going to the television signal circuits of the multiple unauthorized subscribers who are not authorized to view channel Z; and at the end of each cycle, again starting and going through the 2. A method of selectively preventing the viewability by multiple unauthorized subscribers, and allowing the viewability by multiple authorized subscribers, of, where M is an integer, from 1 to M selected television channels, each of which M selected television channels is respectively referred to as channel 1, channel 2, . . . channel M, and each of which M selected television channels is referred to in general as channel Z, where Z represents a number from 1 to M, wherein channel Z has a television signal and a unique carrier wave which has a unique carrier wave frequency, and wherein said television signal has a regularly spaced horizontal synchronization signal and is modulated onto said unique carrier wave, accordingly there are M television signals and M unique carrier waves, and wherein said multiple authorized and multiple unauthorized subscribers are each using a television signal circuit to receive the M television signals of the M selected television channels, which television signals are being transmitted over a controlled access medium to each subscriber's television signal circuit, and accordingly are being transmitted to multiple television signal circuits, as claimed in claim 15; which method is further characterized by using M frequency generating circuits each of which generates a frequency which is also frequency modulated.

3. An apparatus for selectively preventing the viewability by multiple unauthorized subscribers, and allowing the viewability by multiple authorized subscribers, of, where M is an integer, from 1 to M selected television channels, each of which M selected television channels is respectively referred to as channel 1, channel 2, . . . channel M, and each of which M selected television channels is referred to in general as channel Z, where Z represents a number from 1 to M, wherein channel Z has a television signal and a unique carrier wave which has a unique carrier wave frequency, and wherein said television signal has a regularly spaced horizontal synchronization signal and is modulated onto said unique carrier wave, accordingly there are M television signals and M unique carrier waves, and wherein said multiple authorized and multiple unauthorized subscribers are each using a television signal circuit to receive the M television signals of the M selected television channels, which television signals are being transmitted over a controlled access medium to each subscriber's television signal circuit, and accordingly are being transmitted to multiple television signal circuits, which apparatus is comprised of:

(i) generating means for generating an oscillating signal having a duration longer than the duration of any of the regularly spaced horizontal synchronization signals of any of the M television signals;

(ii) M separate frequency generating circuits, each of which generates only one frequency, and each of which is referred to in general as frequency generating circuit Z, wherein frequency generating circuit Z is designed to generate a frequency that, when coupled with the generating means, causes the generating means to generate an oscillating signal having a duration longer than the duration of the regularly spaced horizontal synchronization signal of channel Z and a frequency higher than the unique carrier wave frequency of the carrier wave of channel Z, yet close enough to that carrier wave frequency to be confusing with that carrier wave to a television signal circuit;

(iii) a coupling means which is able to couple any of the M separate frequency generating circuits with the generating means for a period of time at least as short as 63.5 $\mu$S/M, thereby causing the generating means to generate a jamming signal which is referred to in general as jamming signal Z;

(iv) a combining means which receives jamming signal Z from the generating means and is able to combine jamming signal Z, for a period of time as little as approximately 63.5 $\mu$S/M, with the television signals going to the television signal circuits of the multiple unauthorized subscribers who are not authorized to view channel Z; and (v) a service control means for starting and going through a cycle, which cycle consists of instructing the coupling means to couple, in turn, each of the M separate frequency generating circuits with the generating means for separate periods of approximately 63.5 $\mu$S/M each, thereby, in turn, for M periods of approximately 63.5 $\mu$S/M each, producing a different jamming signal Z, and in turn instructing the combining means to combine jamming signal Z with the television signals that are going to the television signal circuits of the multiple unauthorized subscribers who are not authorized to view channel Z, until each jamming signal Z has been combined one time with the television signal circuits of the multiple unauthorized subscribers who are not authorized to view channel Z, at which time the cycle ends, and continuing to start and go through the cycle every time the cycle ends.

4. An apparatus for selectively preventing the viewability by multiple unauthorized subscribers, and allowing the viewability by multiple authorized subscribers, of, where M is an integer, from 1 to M selected television channels, each of which M selected television channels is respectively referred to as channel 1, channel 2, . . . channel M, and each of which M selected television channels is referred to in general as channel Z, where Z represents a number from 1 to M, wherein channel Z has a television signal and a unique carrier wave which has a unique carrier wave frequency, and wherein said television signal has a regularly spaced horizontal synchronization signal and is modulated onto said unique carrier wave, accordingly there are M television signals and M unique carrier waves, and wherein said multiple authorized and multiple unauthorized subscribers are each using a television signal circuit to receive the M television signals of the M selected television channels, which television signals are being transmitted over a controlled access medium to each subscriber's television signal circuit, and accordingly are being transmitted to multiple television signal circuits, as claimed in claim 3; and in which each of the M separate frequency generating circuits, generates a frequency which is also frequency modulated.

5. An apparatus for selectively preventing the viewability by multiple unauthorized subscribers, and allowing the viewability by multiple authorized subscribers, of, where M is an integer, from 1 to M selected television channels, each of which M selected television channels is respectively referred to as channel 1, channel 2, . . . channel M, and each of which M selected television channels is referred to in general as channel Z, where Z represents a number from 1 to M, wherein channel Z has a television signal and a unique carrier wave which has a unique carrier wave frequency, and wherein said television signal has a regularly spaced horizontal synchronization signal and is modulated onto said unique carrier wave, accordingly there are M television signals and M unique carrier waves, and wherein said multiple authorized and multiple unauthorized subscribers are each using a television signal circuit to receive the M television signals of the M selected television channels, which television signals are being transmitted over a controlled access medium to each subscriber's television signal circuit, and accordingly are being transmitted to multiple television signal circuits, which apparatus is comprised of:

(i) an oscillator circuit that generates a frequency modulated oscillating frequency the duration of which may be as little as 63.5 $\mu$S/M;

(ii) a channel element bank made up of a series of M different frequency generating elements each of which is respectively referred to as element 1, element 2, . . . element M, and each of which is referred to in general as element Z, wherein element Z, when connected to the oscillator circuit, will cause the oscillator circuit to generate a frequency higher than the unique carrier wave frequency of the carrier wave of channel Z, yet close enough to that carrier wave frequency to be confusing with that carrier wave to a television signal circuit;

(iii) a coupling means which is able to couple element Z with the oscillator circuit for a period of time at least as short as 63.5 $\mu$S/M, thereby creating a jamming signal, and thereby having the capacity to, one at a time, create M different jamming signals, each of which is respectively referred to as jamming signal 1, jamming signal 2, . . . jamming signal M, and each of which is referred to in general as jamming signal Z;

(iv) a master switch, that is an RF interruptor that has a controlled rise and fall time to minimize the generation of spurious products during switching, which master switch receives jamming signal Z;

(v) a low pass filter that eliminates harmonics, which receives jamming signal Z from the master switch and which eliminates the harmonics in jamming signal Z;

(vi) a set of jamming switches each of which is able to open and close in as little as approximately 63.5 $\mu$S/M, and each of which receives jamming signal Z from the low pass filter;

(vii) a set of subscriber combiner modules each of which couples a different pre-determined one of the jamming signal switches with a pre-determined television signal circuit and each of which can couple and uncouple a jamming signal switch with a television signal circuit in as little as 63.5 $\mu$S/M; and (viii) a service control center that starts a cycle and goes through a cycle, which cycle consists of instructing, in turn, for separate periods of approximately 63.5 μS/M each, where Z, in turn, is each of the numbers 1 to M: the coupling means to couple element Z with the oscillator circuit, and the jamming switches that are coupled to the subscriber combiner modules which are coupled to the television signal circuits of the multiple unauthorized subscribers who are not authorized to view channel Z to close, and the jamming switches that are coupled to the subscriber combiner modules which are coupled with the television signal circuits of the multiple authorized subscribers who are authorized to view channel Z to open, and the master switch to close at the start of each of the periods of approximately 63.5 μS/M and to open immediately after the end of each of the periods of approximately 63.5 μS/M; and continues to start and go through the cycle every time the cycle ends.

6. An apparatus for selectively preventing the viewability by multiple unauthorized subscribers, and allowing the viewability by multiple authorized subscribers, of, where M is an integer, from 1 to M selected television channels, each of which M selected television channels is respectively referred to as channel 1, channel 2, . . . channel M, and each of which M selected television channels is referred to in general as channel Z, where Z represents a number from 1 to M, wherein channel Z has a television signal and a unique carrier wave which has a unique carrier wave frequency, and wherein said television signal has a regularly spaced horizontal synchronization signal and is modulated onto said unique carrier wave, accordingly there are M television signals and M unique carrier waves, and wherein said multiple authorized and multiple unauthorized subscribers are each using a television signal circuit to receive the M television signals of the M selected television channels, which television signals are being transmitted over a controlled access medium to each subscriber's television signal circuit, and accordingly are being transmitted to multiple television signal circuits, as claimed in claim 5; and in which said jamming switches are made up of PIN diode RF switches.

7. An apparatus for selectively preventing the viewability by multiple unauthorized subscribers, and allowing the viewability by multiple authorized subscribers, of, where M is an integer, from 1 to M selected television channels, each of which M selected television channels is respectively referred to as channel 1, channel 2, . . . channel M, and each of which M selected television channels is referred to in general as channel Z, where Z represents a number from 1 to M, wherein channel Z has a television signal and a unique carrier wave which has a unique carrier wave frequency, and wherein said television signal has a regularly spaced horizontal synchronization signal and is modulated onto said unique carrier wave, accordingly there are M television signals and M unique carrier waves, and wherein said multiple authorized and multiple unauthorized subscribers are each using a television signal circuit to receive the M television signals of the M selected television channels, which television signals are being transmitted over a controlled access medium to each subscriber's television signal circuit, and accordingly are being transmitted to multiple television signal circuits, as claimed in claim 5; and in which said oscillator circuit is an LC circuit that produces a frequency modulated oscillating frequency.

8. An apparatus for selectively preventing the viewability by multiple unauthorized subscribers, and allowing the viewability by multiple authorized subscribers, of, where M is an integer, from 1 to M selected television channels, each of which M selected television channels is respectively referred to as channel 1, channel 2, . . . channel M, and each of which M selected television channels is referred to in general as channel Z, where Z represents a number from 1 to M, wherein channel Z has a television signal and a unique carrier wave which has a unique carrier wave frequency, and wherein said television signal has a regularly spaced horizontal synchronization signal and is modulated onto said unique carrier wave, accordingly there are M television signals and M unique carrier waves, and wherein said multiple authorized and multiple unauthorized subscribers are each using a television signal circuit to receive the M television signals of the M selected television channels, which television signals are being transmitted over a controlled access medium to each subscriber's television signal circuit, and accordingly are being transmitted to multiple television signal circuits, as claimed in claim 5; and in which said elements of the channel element bank are LC circuits.

9. An apparatus for selectively preventing the viewability by multiple unauthorized subscribers, and allowing the viewability by multiple authorized subscribers, of, where M is an integer, from 1 to M selected television channels, each of which M selected television channels is respectively referred to as channel 1, channel 2, . . . channel M, and each of which M selected television channels is referred to in general as channel Z, where Z represents a number from 1 to M, wherein channel Z has a television signal and a unique carrier wave which has a unique carrier wave frequency, and wherein said television signal has a regularly spaced horizontal synchronization signal and is modulated onto said unique carrier wave, accordingly there are M television signals and M unique carrier waves, and wherein said multiple authorized and multiple unauthorized subscribers are each using a television signal circuit to receive the M television signals of the M selected television channels, which television signals are being transmitted over a controlled access medium to each subscriber's television signal circuit, and accordingly are being transmitted to multiple television signal circuits, as claimed in claim 5; and in which said coupling means is a combination of switching PIN diodes.

10. An apparatus for for selectively preventing the viewability by multiple unauthorized subscribers, and allowing the viewability by multiple authorized subscribers, of, where M is an integer, from 1 to M selected television channels, each of which M selected television channels is respectively referred to as channel 1, channel 2, . . . channel M, and each of which M selected television channels is referred to in general as channel Z, where Z represents a number from 1 to M, wherein channel Z has a television signal and a unique carrier wave which has a unique carrier wave frequency, and wherein said television signal has a regularly spaced horizontal synchronization signal and is modulated onto said unique carrier wave, accordingly there are M television signals and M unique carrier waves, and wherein said multiple authorized and multiple unauthorized subscribers are each using a television signal circuit to receive the M television signals of the M selected television channels, which television signals are being transmitted over a controlled access medium to each subscriber's television signal circuit, and accordingly are being transmitted to multiple television signal circuits, as claimed in claim 5; and in which said master switch is a PIN diode RF interrupter that has a controlled rise and fall time to minimize the generation of spurious products during switching.

11. An apparatus for selectively preventing the viewability by multiple unauthorized subscribers, and allowing the viewability by multiple authorized subscribers, of, where M is an integer, from 1 to M selected television channels, each of which M selected television channels is respectively referred to as channel 1, channel 2, . . . channel M, and each of which M selected television channels is referred to in general as channel Z, where Z represents a number from 1 to M, wherein channel Z has a television signal and a unique carrier wave which has a unique carrier wave frequency, and wherein said television signal has a regularly spaced horizontal synchronization signal and is modulated onto said unique carrier wave, accordingly there are M television signals and M unique carrier waves, and wherein said multiple authorized and multiple unauthorized subscribers are each using a television signal circuit to receive the M television signals of the M selected television channels, which television signals are being transmitted over a controlled access medium to each subscriber's television signal circuit, and accordingly are being transmitted to multiple television signal circuits, as claimed in claim 5; and in which said low pass filter is made up of capacitors and inductors.

12. An apparatus for for selectively preventing the viewability by multiple unauthorized subscribers, and allowing the viewability by multiple authorized subscribers, of, where M is an integer, from 1 to M selected television channels, each of which M selected television channels is respectively referred to as channel 1, channel 2, . . . channel M, and each of which M selected television channels is referred to in general as channel Z, where Z represents a number from 1 to M, wherein channel Z has a television signal and a unique carrier wave which has a unique carrier wave frequency, and wherein said television signal has a regularly spaced horizontal synchronization signal and is modulated onto said unique carrier wave, accordingly there are M television signals and M unique carrier waves, and wherein said multiple authorized and multiple unauthorized subscribers are each using a television signal circuit to receive the M television signals of the M selected television channels, which television signals are being transmitted over a controlled access medium to each subscriber's television signal circuit, and accordingly are being transmitted to multiple television signal circuits, as claimed in claim 5; and
  (i) in which said oscillator circuit is an LC circuit that produces a frequency modulated oscillating frequency; and
  (ii) in which said elements of the channel element bank are LC circuits; and
  (iii) in which said jamming switches are made up of PIN diode RF switches; and
  (iv) in which said coupling means is a combination of switching PIN diodes; and
  (v) in which said master switch is a PIN diode RF interrupter that has a controlled rise and fall time to minimize the generation of spurious products during switching comprised of a grounded capacitor connected with an inductor (which is called an "RF Choke"); six additional capacitors; five pin diodes; and four additional inductors, wherein a first capacitor, which is the input, is followed by a shunt RF Choke, followed by a series first pin diode, followed by a shunt second capacitor, followed by a series second pin diode, followed by a series first inductor, followed by a shunt third capacitor, followed by a series third pin diode, followed by a series second inductor, followed by a shunt fourth capacitor, followed by a series fourth pin diode, followed by a series third inductor, followed by a shunt fifth capacitor, followed by a series fifth pin diode, followed by a shunt fourth inductor, followed by a series sixth capacitor, which is the output; and
  (vi) in which said low pass filter is made up of capacitors and inductors.

13. An apparatus for selectively preventing the viewability by multiple unauthorized subscribers, and allowing the viewability by multiple authorized subscribers, of, where M is an integer, from 1 to M selected television channels, each of which M selected television channels is respectively referred to as channel 1, channel 2, . . . channel M, and each of which M selected television channels is referred to in general as channel Z, where Z represents a number from 1 to M, wherein channel Z has a television signal and a unique carrier wave which has a unique carrier wave frequency, and wherein said television signal has a regularly spaced horizontal synchronization signal and is modulated onto said unique carrier wave, accordingly there are M television signals and M unique carrier waves, and wherein said multiple authorized and multiple unauthorized subscribers are each using a television signal circuit to receive the M television signals of the M selected television channels, which television signals are being transmitted over a controlled access medium to each subscriber's television signal circuit, and accordingly are being transmitted to multiple television signal circuits, as claimed in claim 5; and in which said master switch is a PIN diode RF interpreter that has a controlled rise and fall time to minimize the generation of spurious products during switching, comprised of a grounded capacitor connected with an inductor (which is called an "RF Choke"); six additional capacitors; five pin diodes; and four additional inductors, wherein a first capacitor, which is the input, is followed by a shunt RF Choke, followed by a series first pin diode, followed by a shunt second capacitor, followed by a series second pin diode, followed by a series first inductor, followed by a shunt third capacitor, followed by a series third pin diode, followed by a series second inductor, followed by a shunt fourth capacitor, followed by a series fourth pin diode, followed by a series third inductor, followed by a shunt fifth capacitor, followed by a series fifth pin diode, followed by a shunt fourth inductor, followed by a series sixth capacitor, which is the output.

* * * * *